US008207814B2

(12) United States Patent
Biles et al.

(10) Patent No.: US 8,207,814 B2
(45) Date of Patent: Jun. 26, 2012

(54) KIT AND SYSTEM FOR PROVIDING SECURITY ACCESS TO A DOOR USING POWER OVER ETHERNET WITH DATA PERSISTENCE AND FIRE ALARM CONTROL PANEL INTEGRATION

(75) Inventors: Phillip Herzog Biles, Anaheim, CA (US); Charles Russell Eurich, Coconut Creek, FL (US); James Michael Festa, Boca Raton, FL (US); Steven George Hemmer, Lake Worth, FL (US); Alex Rodriguez, Miramar, FL (US); Khalil W. Yacoub, Boca Raton, FL (US)

(73) Assignee: UTC Fire & Security Americas Corporation, Inc., Bradenton, FL (US)

(*) Notice: Subject to any disclaimer, the term of this patent is extended or adjusted under 35 U.S.C. 154(b) by 787 days.

(21) Appl. No.: 11/684,179

(22) Filed: Mar. 9, 2007

(65) Prior Publication Data

US 2008/0218330 A1 Sep. 11, 2008

(51) Int. Cl.
*G05B 19/00* (2006.01)

(52) U.S. Cl. .......................... 340/5.2; 340/5.3; 340/5.32

(58) Field of Classification Search .................. 340/506, 340/507, 522, 527, 528, 531, 532, 539.14, 340/539.16, 539.22, 541, 542, 545.9, 652, 340/5.3, 5.31, 5.33, 7.32, 310.11, 310.12, 340/286.01, 286.02, 286.05, 286.06, 288, 340/287, 292, 293, 5.2, 5.32
See application file for complete search history.

(56) References Cited

U.S. PATENT DOCUMENTS

| | | | | | |
|---|---|---|---|---|---|
| 4,455,510 | A | | 6/1984 | Lesko et al. | |
| 4,574,223 | A | | 3/1986 | Pitel | |
| 4,996,525 | A | * | 2/1991 | Becker et al. | 340/5.64 |
| 5,070,442 | A | * | 12/1991 | Syron-Townson et al. | 700/17 |
| 5,381,136 | A | * | 1/1995 | Powers et al. | 340/539.26 |
| 5,764,138 | A | | 6/1998 | Lowe | |
| 5,832,090 | A | | 11/1998 | Raspotnik | |
| 5,864,580 | A | | 1/1999 | Lowe | |
| 5,898,241 | A | | 4/1999 | Ganderillas | |
| 5,908,103 | A | | 6/1999 | Dlugos | |
| 5,936,529 | A | * | 8/1999 | Reisman et al. | 340/573.1 |
| 5,955,946 | A | * | 9/1999 | Beheshti et al. | 340/506 |
| 6,129,963 | A | | 10/2000 | Lesko et al. | |
| 6,229,300 | B1 | | 5/2001 | Dlugos | |
| 6,476,708 | B1 | | 11/2002 | Johnson | |
| 6,566,997 | B1 | | 5/2003 | Bradin | |
| 6,577,185 | B1 | | 6/2003 | Chandler et al. | |

(Continued)

FOREIGN PATENT DOCUMENTS

WO WO2006/084271 8/2006

*Primary Examiner* — Daniel Wu
*Assistant Examiner* — Rufus Point
(74) *Attorney, Agent, or Firm* — MH2 Technology Law Group, LLP

(57) ABSTRACT

The present disclosure describes embodiments of a power-over-ethernet ("POE") controller and an access control system comprising the same. In an embodiment, the access control system includes a POE controller configured to couple with a Fire Access Control Panel of an automated Fire Detection System. The access control system may further include one or more peripheral devices coupled with the POE controller and configured to be powered with electrical power received via an ethernet port of the POE controller. The peripheral devices may include an access device, a door strike, and a digital output device. Embodiments of a kit containing one or more partially or fully assembled components of the access control system are also described.

22 Claims, 6 Drawing Sheets

U.S. PATENT DOCUMENTS

| | | | | |
|---|---|---|---|---|
| 6,580,696 | B1 | 6/2003 | Chen et al. | |
| 6,583,720 | B1 * | 6/2003 | Quigley | 340/521 |
| 6,597,783 | B1 | 7/2003 | Tada et al. | |
| 6,598,183 | B1 | 7/2003 | Grieco et al. | |
| 6,606,681 | B1 | 8/2003 | Uzun | |
| 6,611,624 | B1 | 8/2003 | Zhang et al. | |
| 6,639,703 | B1 | 10/2003 | Egnell | |
| 6,650,227 | B1 | 11/2003 | Bradin | |
| 6,684,005 | B1 | 1/2004 | Egnell et al. | |
| 6,686,804 | B1 | 2/2004 | Adams et al. | |
| 6,704,883 | B1 | 3/2004 | Zhang et al. | |
| 6,720,861 | B1 * | 4/2004 | Rodenbeck et al. | 340/5.64 |
| 6,792,457 | B1 | 9/2004 | Zhang et al. | |
| 6,807,638 | B1 | 10/2004 | Moyal et al. | |
| 6,831,898 | B1 | 12/2004 | Edsall et al. | |
| 6,832,279 | B1 | 12/2004 | Potter et al. | |
| 6,834,058 | B1 | 12/2004 | Moyal et al. | |
| 6,845,467 | B1 | 1/2005 | Ditner et al. | |
| 6,883,012 | B1 | 4/2005 | Ryan | |
| 6,888,413 | B1 | 5/2005 | Adams et al. | |
| 6,888,801 | B1 | 5/2005 | Hock | |
| 6,931,101 | B1 | 8/2005 | Wildfeuer | |
| 6,948,044 | B1 | 9/2005 | Chandrasekan | |
| 6,957,358 | B1 | 10/2005 | Sundaresan et al. | |
| 6,959,044 | B1 | 10/2005 | Jin et al. | |
| 6,968,092 | B1 | 11/2005 | Winger | |
| 7,003,062 | B1 | 2/2006 | Leyn | |
| 7,012,901 | B2 | 3/2006 | Jagadeesan et al. | |
| 7,035,262 | B1 | 4/2006 | Joshi | |
| 7,039,716 | B1 | 5/2006 | Jagadeesan | |
| 7,085,918 | B2 | 8/2006 | Sharangpani et al. | |
| 7,099,287 | B1 | 8/2006 | Oz et al. | |
| 7,113,584 | B2 * | 9/2006 | Seay | 379/353 |
| 7,136,709 | B2 * | 11/2006 | Arling et al. | 700/65 |
| 7,148,810 | B2 * | 12/2006 | Bhat | 340/692 |
| 7,154,381 | B2 * | 12/2006 | Lang et al. | 340/12.32 |
| 7,218,217 | B2 * | 5/2007 | Adonailo et al. | 340/522 |
| 7,333,010 | B2 * | 2/2008 | Barrieau et al. | 340/514 |
| 7,369,037 | B2 * | 5/2008 | Piccolo et al. | 340/286.01 |
| 7,391,319 | B1 * | 6/2008 | Walker | 340/536 |
| 7,461,174 | B2 * | 12/2008 | Chan et al. | 709/250 |
| 7,583,188 | B2 * | 9/2009 | Sawhney | 340/507 |
| 7,734,572 | B2 * | 6/2010 | Wiemeyer et al. | 700/19 |
| 2002/0133655 | A1 * | 9/2002 | Falik et al. | 710/200 |
| 2005/0085212 | A1 * | 4/2005 | Peker et al. | 455/402 |
| 2005/0231349 | A1 * | 10/2005 | Bhat | 340/506 |
| 2006/0250271 | A1 * | 11/2006 | Zimmerman | 340/825.36 |
| 2007/0008068 | A1 * | 1/2007 | Brice et al. | 340/5.91 |
| 2007/0019560 | A1 | 1/2007 | Brewer et al. | |
| 2007/0075586 | A1 * | 4/2007 | Bogue | 307/66 |
| 2007/0241879 | A1 * | 10/2007 | Jobe et al. | 340/506 |
| 2008/0204220 | A1 * | 8/2008 | Baird et al. | 340/506 |

* cited by examiner

KIT AND SYSTEM FOR PROVIDING SECURITY ACCESS TO A DOOR USING POWER OVER ETHERNET WITH DATA PERSISTENCE AND FIRE ALARM CONTROL PANEL INTEGRATION

BACKGROUND

1. Field of the Invention

The present disclosure relates to security systems generally, and more particularly, to a kit, a power-over-ethernet system, and an apparatus for controlling access to one or more doors.

2. Discussion of Related Art

Access control systems are used to prevent rooms or other areas from being visited by unauthorized persons. Such systems typically include an electrically operated door strike, an access device, and a controller configured to operate the door strike and the access device. However, one or more external power supplies and multiple wire connections are required, which makes installing such systems costly and time-consuming.

FIG. 7 is a diagram illustrating an example of a typical access control system 700. The access control system 700 includes a controller 701 and a controller support 704. The controller 701 is configured to manage the operation of an access device 707 and a door strike 708. A communications path 716 links the controller 701 to a network 720 and to a remote host computer 704.

The access control system 700 uses at least two power supplies. One power supply 702, which converts 110 VAC PWR to 12 VDC PWR, powers the controller 701. Another power supply 703, which converts 110 VAC PWR to 12/24 VAC/VDC PWR, powers other components of the access control system 700 (and/or the controller 701).

A junction box 705 is connected via a wire 714 to the controller 701 via a wire 713 to the power supply 703, and via a wire 715 to an exit device 706. The junction box 705 is further connected via a wire 710 to the door strike 708, via a wire 711 to the access control reader 707, and via a wire 712 to a door sensor 717. The door sensor is configured to detect whether the door is open or closed and to relay this information to the controller 701.

Access control systems and automated fire detection systems are not typically interlinked. Consequently, emergency personnel responding to a detected fire are sometimes not able to manually override an access control system that has automatically locked one or more doors (e.g., has "failed secure").

What is needed is an access control system having a controller, an access device, and a door strike that operate using electrical power provided via an ethernet port of the controller (e.g., an access control system that does not require external power supplies to be installed for each system component). What is also needed is an access control system having a power-over-ethernet ("POE") controller having a Fire Alarm Control Panel ("FACP") connector and a FACP circuit that is configured to override the POE controller and de-latch a door strike when the Fire Alarm Control Panel is in an alarm condition.

BRIEF DESCRIPTION

In summary, embodiments of the invention are configured to provide distributed processing for an interface of access devices, keypads, alarm inputs and outputs, and the like, back to a host system computer. In an embodiment of the invention, an apparatus may comprise a controller configured to receive electrical power over an ethernet connection. The controller may comprise a printed circuit board (PCB) (configured as herein described and shown) that is protected by a tamper-proof enclosure. The controller may further comprise an ethernet port. The PCB may be configured to deliver and/or transform all or a portion of electrical power received via the controller's ethernet port (over a previously established ethernet communications path) to components of the controller and/or to one or more peripheral devices coupled with the controller. The controller and/or the peripheral devices may each also comprise a back-up power source such as a battery, a solar cell, a fuel cell, etc. Non-limiting examples of a peripheral device may include an access device, a door strike, and the like. Non-limiting examples of an access device may include an access control reader, a keypad, a biometric identification device, and the like.

The distributed processing afforded by embodiments of the invention advantageously allows the power-over-ethernet ("POE") controller (and an access device and electric door strike coupled therewith) to operate independently of a host system computer and to make access control and alarm monitoring decisions locally. In an embodiment, the access control and alarm monitoring decisions are made locally using information contained in a database that is stored in a memory of the controller. The database and/or some or all of the information stored therein may be downloaded from and/or synchronized with a host system computer over the ethernet communications path. In this manner, embodiments of the invention provide instant response for door control and alarm sensing in the field, while leaving the host system computer with more processing power for quickly executing daily operations such as alarm response, database updates and reporting. Also in this manner, embodiments of the invention have the ability to make access control and alarm monitoring decisions even during times when the host system computer is unreachable or inoperable.

Embodiments of the controller may incorporate "FLASH" memory technology. Incorporation of "FLASH" memory in the controller advantageously allows the controller to receive its operating system and/or application(s) remotely from the host system computer over the previously established ethernet communications path. Consequently, firmware upgrades that occur after the controller (and or its peripheral devices) are installed can be "pushed" to the controller from the central host system computer, which eliminates costly service trips that were formerly required to install firmware updates. Both the modular design of the controller (and/or its peripheral devices) and the "FLASH" memory technology incorporated within at least the controller provide a simple migration path when considering future host system upgrades.

Embodiments of the controller and/or the access device may be configured to provide Fire Alarm Control Panel ("FACP") access and/or integration. This advantageously equips the controller, the access device, and/or a door strike coupled with the controller to operate at the direct command of emergency personnel in situations when the FACP experiences an alarm condition. In this manner, one or more access-controlled doors can be operated during times of emergency. As used herein, the term "operated" (as used with respect to doors) comprises opening, closing, locking, unlocking a door, or combinations thereof.

Other features and advantages of embodiments of the invention will be apparent by examining the following detailed description in connection with the accompanying drawings.

BRIEF DESCRIPTION OF THE DRAWINGS

In the accompanying drawings.

Like reference characters designate identical or corresponding components and units throughout the several views.

DETAILED DESCRIPTION

Figure 1:
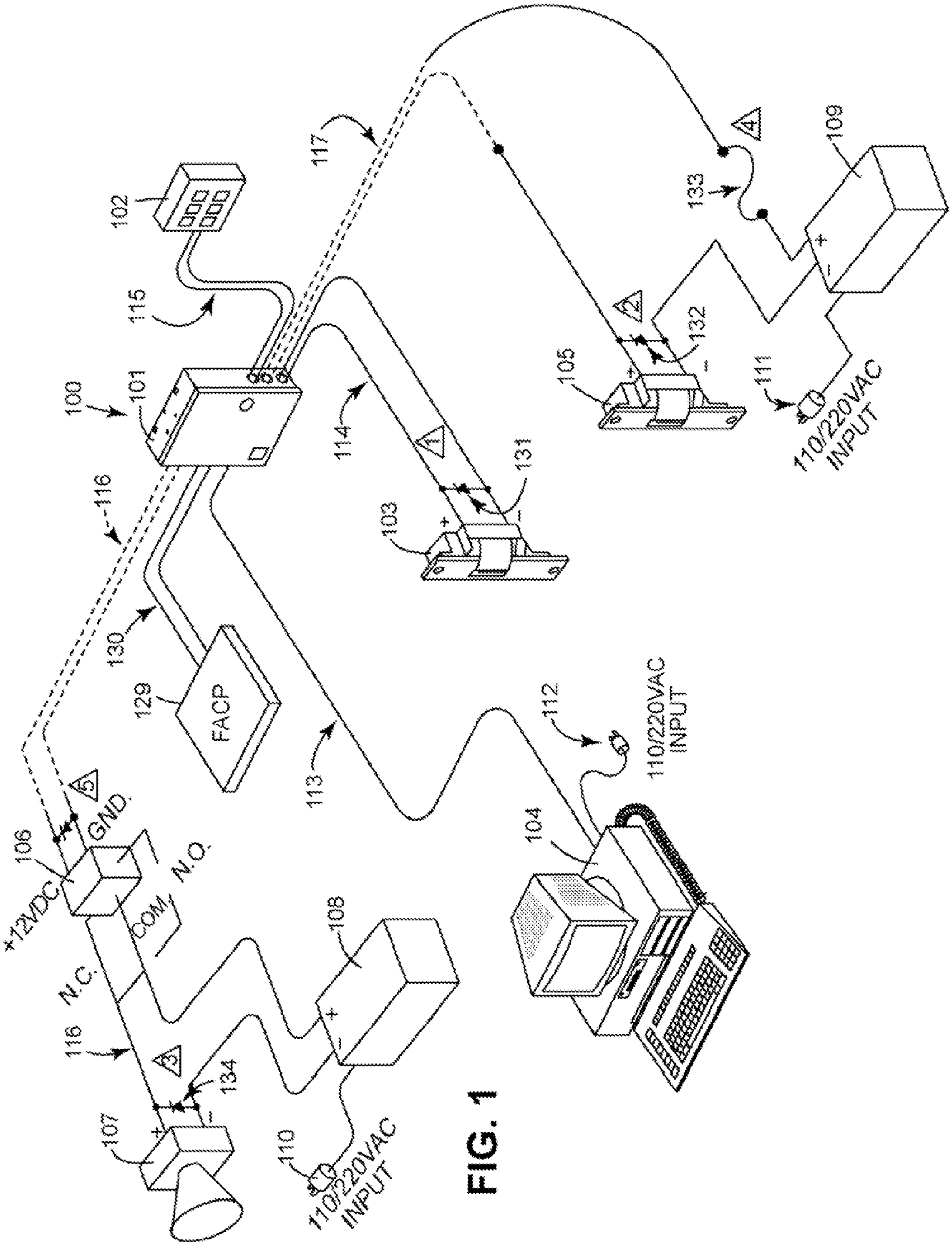
FIG. 1 is a diagram illustrating an embodiment of a networked system that includes an embodiment of a power-over-ethernet controller configured to couple with a Fire Access Control Panel of an automated fire detection system.

FIG. 1 is a diagram illustrating an embodiment of a networked access control system 100 that includes an embodiment of a power-over-ethernet ("POE") controller 101 comprising an integrated Fire Access Control Panel ("FACP") circuit. The POE controller may further comprise a FACP port having input terminals configured to couple the POE controller with the FACP of an automated fire detection system.

An ethernet communications path 113 connects the controller 101 with a remote host computer 104, which is powered by an 110/220V AC input 112. Alternatively, the host computer 104 may be powered by a power source such as a battery, a fuel cell, etc. The ethernet communications path 113 may include one or more pieces of ethernet cable and/or one or more switches, relays, routers, and/or other computer network devices. The ethernet communications path 113 is used to convey data between at least the POE controller 101 and the remote host computer 104, and is also used to convey electrical power to the POE controller 101 via the controller's ethernet port. Although not shown in FIG. 1, the electrical power supplied over the ethernet communications path 113 is provided by a POE source. In one embodiment, the POE source may be integrated within a network device (e.g., gateway, hub, host computer, etc.). Alternatively, an external POE source may be coupled with a network device. Portions of or all of the electrical power received via the ethernet port of the POE controller 101 are distributed to one or more peripheral devices connected with the POE controller 101.

In an embodiment, non-limiting examples of peripheral devices include a door strike 103 and an access device 102. The access device 102 may be a peripheral device such as an access control reader, a biometric identification device, a keypad, and the like. The door strike 103 may be an electric door strike, a magnetic door strike, or an electromagnetic door strike. A communications path 114 connects the POE controller 101 with the door strike 103. Electrical power (e.g., current/voltage) from one or more components of the POE controller 101 are routed over the communications path 114 to control operation of the door strike 103 (e.g. to latch/delatch the door strike, which has the effect of locking/unlocking a door next to which the door strike is installed). This electrical power may be derived from electrical power received via the POE controller's ethernet port. In one embodiment, the communications path 114 may comprise a pair of shielded (or unshielded) wires. One wire is connected with a positive terminal of the door strike, and the other wire is connected with a negative terminal of the door strike. As denoted by the triangle containing the numeral "1", a protection device should be connected across the door strike 103. In one embodiment, the protection device is a diode 131 having its cathode to the positive side of the door strike 103.

The access device 102 may be an access control reader. The access control reader may comprise a keypad, a magnetic stripe reader, a RFID reader, a biometric scanner, a camera, a microphone, and/or a display. A communications path 115 connects the access device 102 with the POE controller 101. Electrical power (e.g., current/voltage) from one or more components of the POE controller 101 is routed over the communications path 115 to power the access device 102. This electrical power may be derived from electrical power received via the POE controller's ethernet port (J10 in FIG. 6). The communications path 115 is also used to transmit data between the POE controller 101 and the access device 102. The data transmitted over the communications path 115 may include, but is not limited to, signals that cause one or more components of the POE controller 101 to generate and transmit electrical power over the communications path 114 to operate the door strike 103. In one embodiment, the communications path 115 comprises a pair of shielded wires.

In an embodiment, the access device 102 receives identification data from a user of the access control system 100 and relays this identification data to the controller 101, which processes the identification data to determine the access privileges (if any) associated therewith. If appropriate access privileges exist, the controller 101 may operate to delatch the door strike 103/105. If insufficient (or revoked) access privileges exist, the controller 101 may keep the door strike 103/105 securely latched.

Figure 6:
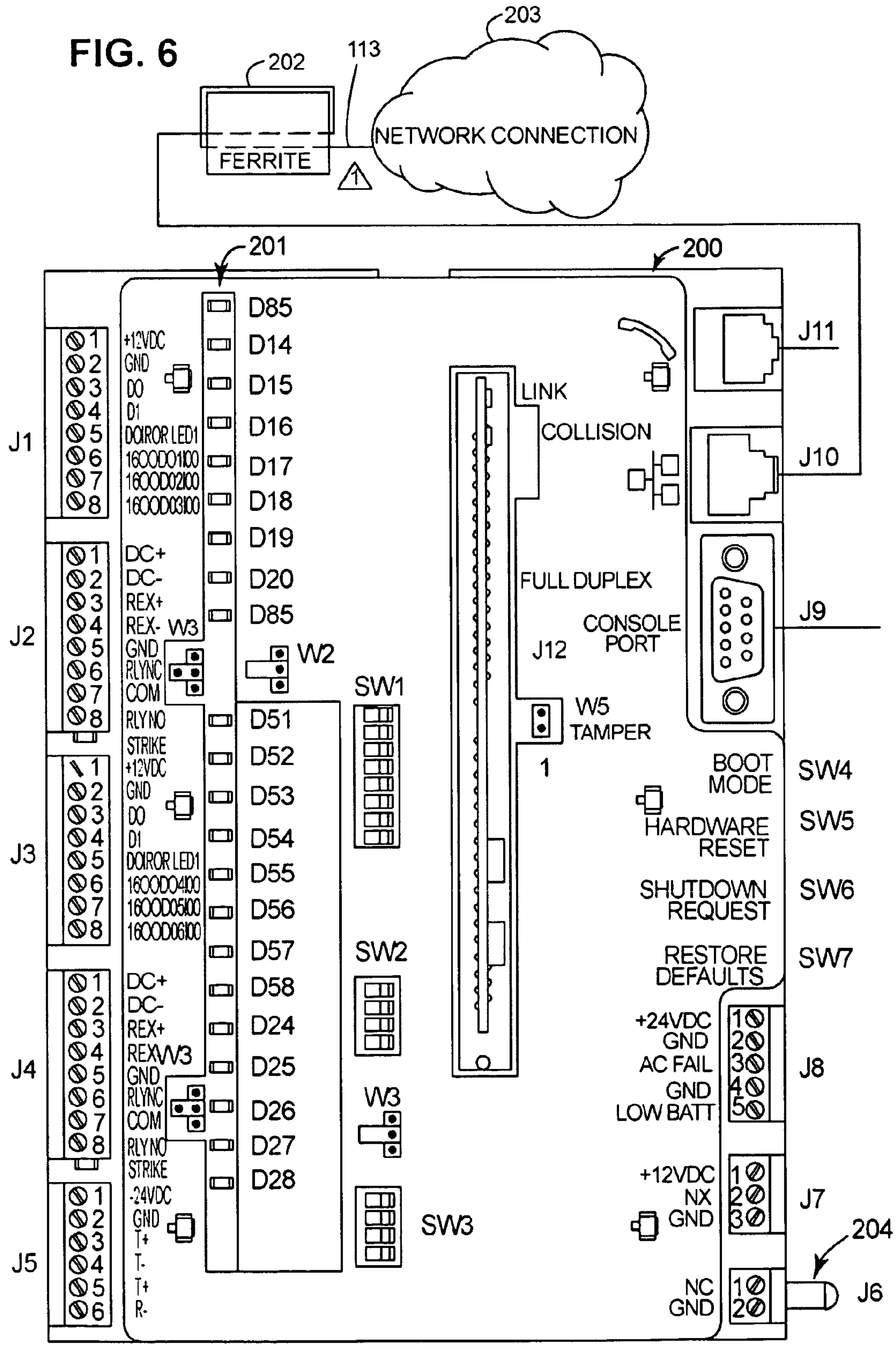
FIG. 6 is a diagram of an embodiment of a CPU printed-circuit-board that comprises an embodiment of the power-over-ethernet controller of FIG. 1.

The POE controller 101 is configured to be optionally connected with a Fire Alarm Control Panel ("FACP") 129 via a FACP communication path 130, which may comprise a pair of shielded wires. The FACP 129 is configured to override the POE controller 101 and de-latch the door strike when the FACP is in an alarm condition. An alarm condition may be generated at least by operation of a fire detection sensor, a manual switch, and/or by operation of a fire alarm pull device. If the POE controller 101 is not connected with the FACP 101, a jumper may be connected across the POE controller's FACP connectors (J6—as shown in FIG. 6). For failsafe and redundancy purposes, the FACP 129 is powered by its own local power supply (not shown).

Optionally, an embodiment of a controller 101 may be powered by a local power supply or backup power supply (e.g., a battery, a solar cell, a fuel cell, and equivalents) (not shown). In such an embodiment, a door strike 105 powered by another local power supply 109 may be coupled with the POE controller 101. The local power supply 109 may be powered via a 110/220V AC input 111. A communications path 117 formed of two or more shielded wires may connect both the door strike 105 and the local power supply 109 with the POE controller 101. As indicated by the triangle containing number "2", a protection device should be connected across the door strike 105. The protection device may be a Metal Oxide Varistor ("MOV") or a diode 132. For an AC-type door strike 105, a MOV type protection device should be used. For a DC-type door strike 105, a diode protection device should be used, with the cathode of the diode 132 connected to the positive side of the door strike 105. As indicated by the triangle containing the number “4”, there is a current restriction through the relay (not shown) in the controller 101. The fuse 133 couples the local power supply 109 with the POE controller 101 and serves to protect the relay. In an embodiment, the current restriction should be limited to less than about 2 amps to prevent damage to the relay in the POE controller 101, but different embodiments may require different current restrictions (if any). The current limiting may be achieved either by using a power supply 109 that has built in current limiting or by wiring in a fuse that is external to the power supply 109.

Although not shown, a separate local power supply may be used to power the access device 102.

Additionally, another communications path 116 may couple the controller 101 with a relay 106 and further couple the relay 106 with an output device 107 and its local power supply 108. The local power supply 108 may receive electrical power via a 110/220V AC input 110 (and/or via a power source such as a battery, fuel cell, etc.). The communications path 116 may comprise two or more shielded wires. As indicated by the triangle containing the numeral “3”, a protection device (such as diode 134) may be connected across the output device 107 (with the cathode of the diode 134 connected with a positive side of the output device 107). As indicated by the triangle containing the numeral “5”, there may be a current restriction through the relay coil 106. In an embodiment, the current through the relay coil 106 is limited to less than about 0.2 amps to prevent damage to the POE controller 101. Other embodiments of the invention, however, may required a different current restriction (if any). Non-limiting embodiments of an output device 107 include a siren, a horn, a lamp, etc. In an embodiment, a signal produced by the controller 101 causes the output device 107 to produce a visual and/or audio indication of an alarm event.

Referring again to FIG. 1, an exemplary installation and operation of the POE controller 101 is described. The POE controller 101, the access device 102, and the door strike 103 are installed at a door for which access control is desired. Specifically, the POE controller 101 is installed above (or adjacent a side of) the door and on a side of the wall that is interior to the room/area to be protected. If the room/area to be protected includes an automated fire detection system, the POE controller 101 is connected with the automated fire detection system’s FACP.

Additionally, the door’s mechanical door strike is removed and replaced with the door strike 103. Shielded wires forming the communications path 114 are connected to the door strike 103 and to the POE controller 101. As noted above, a protection device 131 is connected across the door strike 103. The access device 102 is installed next to the door on a side of a wall that is exterior to the room/area to be protected. Shielded wires forming the communications path 115 are connected to the POE controller 101 and to the access device 102. An ethernet cable, forming the ethernet communication path 113, is then connected to the POE controller’s ethernet port. In this (or equivalent) manner, one or more doors may be quickly and inexpensively equipped with an access control system.

Connecting an ethernet cable between the host computer 104 (or a network device such as a gateway, a router, a hub, etc.) and the POE controller 101 provides a path for electrical power to the access device 102 supplied by a POE source (not shown, but described above) and/or to the door strike 103. Within the controller 101, a circuit (not shown) coupled with the controller’s ethernet port (J10 in FIG. 6) is configured to transform all or part of the electrical power received via the ethernet port and to route the same to one or more components of the controller 101 and to at least one peripheral device (102, 103,106) coupled with the controller 101.

Connecting an ethernet cable to the POE controller 101 also allows data to be transmitted between the host computer 104 and the POE controller 101. Data (if any) transmitted between the host computer 104 and the access device 102 passes through the controller 101. The POE controller 101 may include a microprocessor (not shown) that is configured to program the POE controller 101, to dynamically load one or more firmware programs and/or software programs to a memory of the POE controller 101, and to program one or more peripheral devices when the one or more peripheral devices are coupled with the POE controller 101. A memory (not shown) of the POE controller 101 may contain a database of stored information that permits stand-alone operation of the POE controller 101, the door strike 103, and the access device 102 when data transfer between the POE controller 101 and a host computer 104 ceases. Additionally, the POE controller 101 may be further configured to transmit to the host computer 104 data indicative of at least one of: detected tampering of the controller housing, an AC power failure, and a low battery pack back-up condition.

User identification codes and associated access privileges generated by the host computer 104 and/or stored in a memory thereof may be transmitted (in real time or in near real-time) to the memory of the POE controller 101. Optionally, the POE controller 101 may relay these codes and access privileges to the access device 102. Additionally, data indicating access records and/or operational status of the POE controller 101 and/or its peripherals (access device 102, door strike 103, door strike 105, digital output device 107, etc.) may be stored in a memory of the POE controller 101 and/or transmitted via the ethernet communications path 113 to the host computer 104.

Once the POE controller 101, the access device 102, and the door strike 103 have been installed and configured, a person desiring access to the protected room/area interacts with the access device 102. Such interaction may occur via keypad entry, magnetic card swipe, smart card proximity “handshake,” biometric scanning, facial recognition, and/or voice recognition. Based on this interaction, the POE controller 101 compares the identification data provided by the user to a database of user identification data and associated access privileges. This database of user identification data and associated access privileges may be stored in the memory of the POE controller 101 and/or updated in real-time or near real-time by the host computer 104. If a match with appropriate access privileges is found, the door strike 103 is operated to allow the user to open the door, and an access log entry is created. The access log (and its entries) is stored in the memory of the POE controller and may be transmitted to the host computer 104 via the ethernet communications path 113. If no match is found (or if a match is found that has revoked access privileges), the door strike 103 is operated to prevent the door from being opened. An access log entry to record the denial of entry may be generated and stored (in the memory of the POE controller 101).

Figure 2:
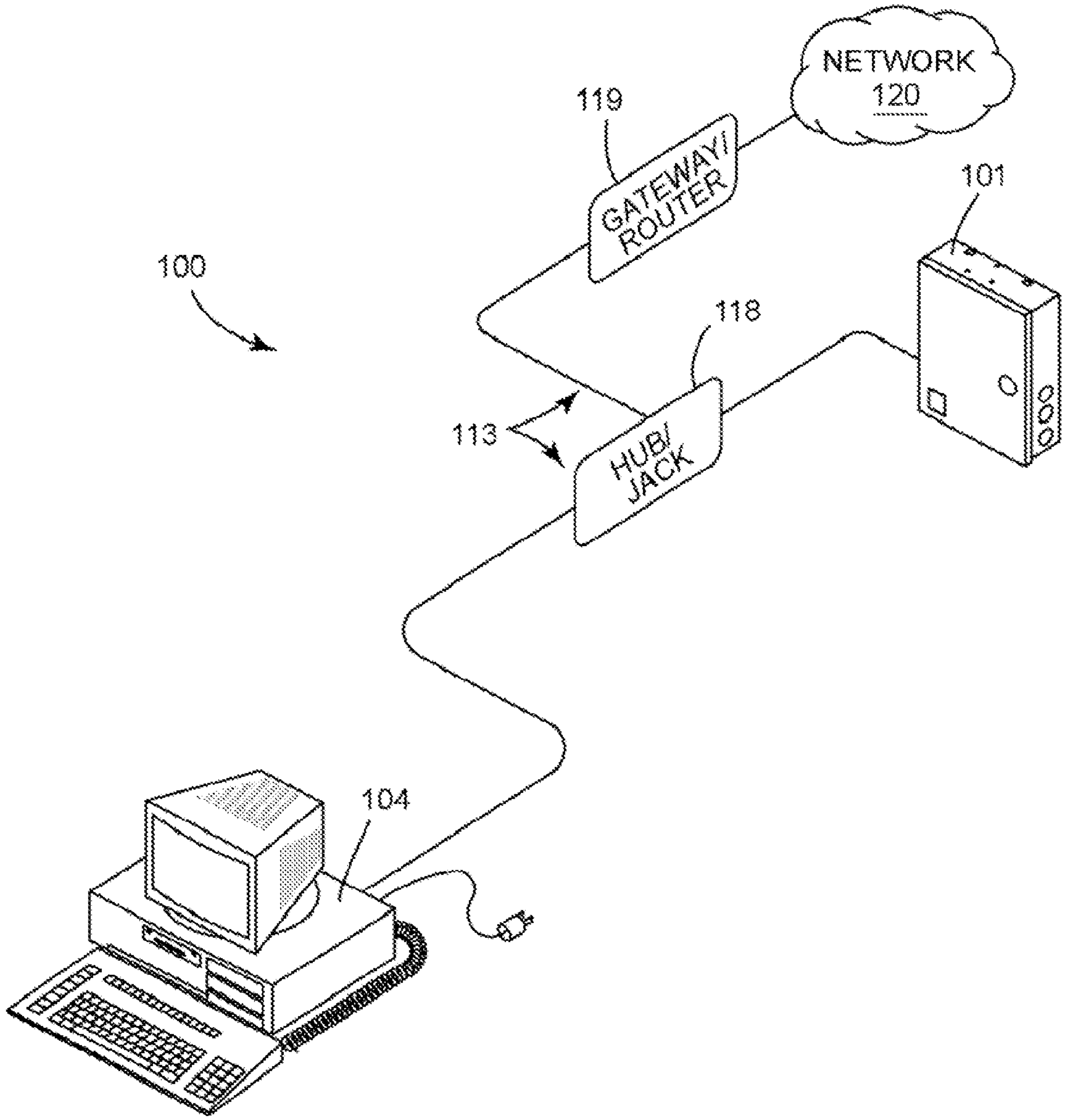
FIG. 2 is a diagram that illustrates an alternate network configuration for connecting an embodiment of the power-over-ethernet controller of FIG. 1 with a remote host computer.

FIG. 2 is a diagram that illustrates a system 100 having an alternate network configuration for connecting an embodiment of the POE controller 101 of FIG. 1 with the remote host computer 104, assuming the hub/jack 118 is a POE source. If the hub/jack 118 is not a POE source, the system 100 may be alternatively configured. Although omitted in FIG. 2 for simplicity and ease of illustration, the system 100 is understood to comprise at least the additional elements shown in FIG. 1 and described above. Referring now to FIG. 2, the ethernet communications path 113 may comprise a hub/jack 118, a gateway/router 119, and a network 120. The network 120 may comprise a wide area network ("WAN") such as the Internet and/or a local area network ("LAN").

Figure 3:
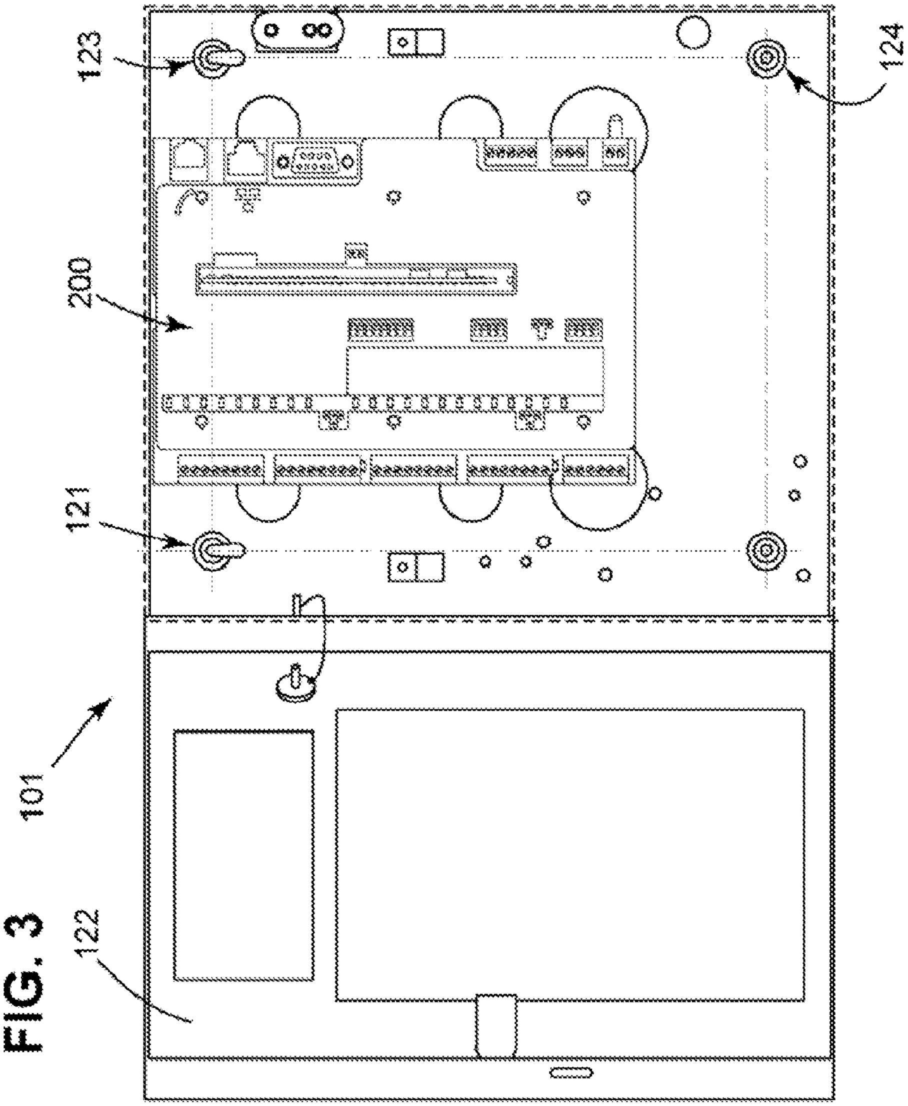
FIG. 3 is a front view of an embodiment of the power-over-ethernet controller of FIG. 1.

FIG. 3 is a front view of an embodiment of the POE controller 101 of FIG. 1. The POE controller 101 may include a tamper-proof enclosure (or housing) that comprises a base portion 121 and a hinged, latchable door 122. In FIG. 3, the door 122 is shown in an open position so that the interior of the enclosure's base portion 121 can be seen. The base portion 121 includes a base plate and four sidewalls attached thereto. Mounting holes 123 are provided in the base plate for securing the POE controller 101 to a wall or other substrate. Fasteners (not shown) are inserted through the mounting holes 123 to fasten the base portion 121 in place. A CPU printed circuit board ("PCB") 200 is mounted within the interior of the base portion 121. Configuration and operation of the PCB 200 are described below with respect to FIG. 6.

Figure 4:
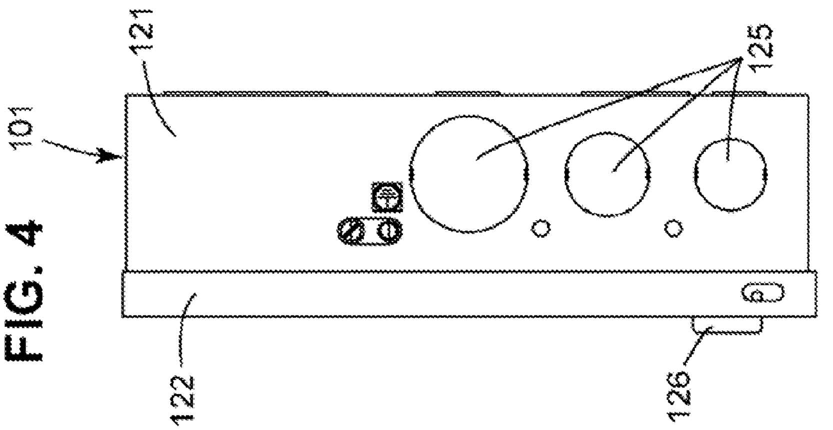
FIG. 4 is a side view of an embodiment of the power-over-ethernet controller of FIG. 1.

FIG. 4 is a side view of an embodiment of the tamper-proof enclosure of the POE controller 101 of FIG. 1. As shown in FIG. 4, the tamper-proof enclosure includes a base portion 121 and a hinged door 122. The door 122 includes a latch mechanism 126. A sidewall of the base portion 121 includes one or more removable stamped cut-outs 125. When these stamped cut-outs 125 are removed, shielded wires and/or ethernet cable may be introduced within the interior of the base portion 121 and connected to the PCB 200.

Figure 5:
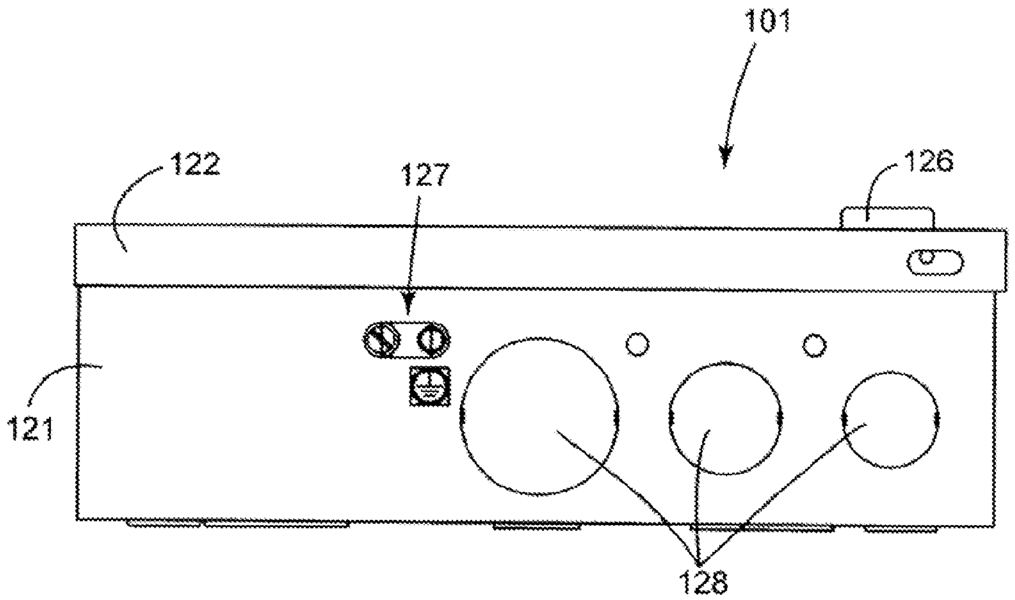
FIG. 5 is a bottom view of an embodiment of the power-over-ethernet controller of FIG. 1.

FIG. 5 is a bottom view of an embodiment of tamper-proof enclosure of the POE controller 101 of FIG. 1. FIG. 5 illustrates the base portion 121, the hinged door 122, and the latch mechanism 126 previously shown and discussed. Additionally, FIG. 5 illustrates an earth ground connector 127 attached to the sidewall of the base portion 121 and one or more removable stamped cut-outs 128. The earth ground connector 127 is electrically connected to the PCB 200. When the POE 101 is installed, a ground wire (or wires) is connected at one end to the earth ground connector 127 and connected at the other end with ground. The stamped cut-outs 128 may be removed and shielded wires and/or ethernet cable inserted into the interior of the base portion 121 and connected to the PCB 200. Additionally, the shielding of the wires may be connected to the earth ground connector 127.

FIG. 6 is a diagram of an embodiment of a CPU printed-circuit-board ("PCB") 200 that comprises an embodiment of the POE controller 101 of FIG. 1. The PCB 200 comprises ports (also called jumpers and/or connectors) J1, J2, J3, J4, J5, J6, J7, J8, J9, J10, J11, J12, W2, W3, and W5. Each of ports J1, J2, J3, and J4 comprise eight pins (numbered 1, 2, 3, 4, 5, 6, 7, and 8). The port J5 comprises six pins (numbered 1, 2, 3, 4, 5, and 6). The PCB 200 further comprises switches SW1, SW2, and SW3 as well as a bank of LEDs (listed in the order shown in the exemplary diagram of FIG. 6) D85, D14, D15, D16, D17, D18, D19, D20, D21, D51, D52, D53, D54, D55, D56, D57, D58, D24, D25, D26, D27, and D28. The PCB 200 further comprises ports P1, P2, P3, and P4 for modem use. Each of these components is more fully described, below.

Ports

Ports J1, J2, J3, J4, and J5 are used to connect one or more peripherals to the PCB 200. Illustratively, an access device (such as a Wiegand-type access control reader) may be connected to port J1. Another Wiegand-type access device may also be connected to the port J3. Alternatively, another type of access device (such as a F/2F access control reader) may be connected to port J1 and/or to port J3. Other types of access devices include a Strobed-type access control reader and a Supervised F/2F-type access control reader.

Additionally, a door alarm contact and exit request button may be connected to pins 1, 2, 3, and 4 of port J2 (using Belden 8725 or equivalent). A second door alarm contact and exit request button may be connected to pins 1, 2, 3, and 4 of port J4 (using Belden 8725 or equivalent).

A door strike (powered using electrical power provided via the ethernet port J10) may be connected to pins 6, 7, and 8 of port J2 (using Belden 8725 or equivalent). A door strike (powered using a local power supply) may be connected to pins 6, 7, and 8 of port J4 (using Belden 8725 or equivalent). For door strikes powered using electrical power provided via the ethernet port J10, a jumper wire should be positioned on connector W2 and/or connector W3 to select either 12 VDC or 24 VDC strike power. Pins 1 and 2 may be used for 12 VDC and pins 2 and 3 may be used for 24 VDC. When an external power supply is used to power a door strike no jumper should be used. For shielded wire, the shield grounds must be stripped back through the stamped cut-outs and grounded to the earth ground connector.

Port J5 is a pluggable screw terminal block.

Port J6 is used to connect the PCB 200 to a Fire Alarm Control Panel ("FACP") of an automated fire system. If a FACP is not used, the jumper 204 shown on the J6 FACP input should remain in place for correct operation of the POE controller (101 in FIG. 1).

Port J7 is a pluggable screw terminal block.

Port J8 is a pluggable screw terminal block that may be used to connect a 24 VDC, 1 amp auxiliary power supply to the PCB 200.

Port J9 is a nine-pin female D-sub-receptacle, which controls a console port.

Port J10 (ethernet port) is an RJ45 Standard Cat 5 ethernet jack, which controls a RJ45 ethernet network connection. one end of an ethernet cable 113 may be looped through ferrite 202 before removably connecting to the port J10. The other end of the ethernet cable 113 is coupled with a host computer or a network connection (e.g., a gateway, a router, etc.) that has an integrated POE source or is coupled with an external POE source.

Port J11 is a RJ11 standard telephone jack.

Port J12 is an insertion jack for a microprocessor.

W5 is a two-pin jumper that provides tamper inputs that permit the housing of the POE controller be protected against and/or monitored for unauthorized tampering.

Switches

P1, P2, P3, and P4 (not shown) are connectors used by a modem. In an embodiment, the connectors P1, P2, P3, and P4 (and other circuit elements) are covered by a substrate of the PCB 200.

SW1, SW2 and SW3 are sets of DIP switches used for configuring the PCB 200 to operate with various types of peripheral devices such as, but not limited to Magstripe readers and Wiegand readers. SW1 includes eight DIP switches; SW2 includes four DIP switches, and SW3 includes four DIP switches. For example, to connect one type of Magstripe reader, DIP switches 1 and 2 of SW1 are set to "ON". To connect one type of Wiegand reader, DIP switches 1 and 4 of SW1 are set to "ON." Other SW1 DIP switch combinations may be used to connect other types of readers and/or other kinds of peripheral devices. In most embodiments, the DIP switch 4 of SW2 is set to "OFF". The DIP switches 1, 2, 3, 4 of SW3 are turned on or off depending on the type of communication protocol used to make the connection. For 120 ohms transmit pair termination, DIP switch 1 of SW3 is "ON". For no transmit pair termination (default), DIP switch 1 of SW3 is "OFF". For 120 ohms receive pair termination, DIP switch 2 of SW3 is "ON". For no receive pair termination, DIP switch 2 of SW3 is “OFF”. For RS485-4 wire (default), DIP switches 3 and 4 of SW3 are “ON”. For RS485-2 wire, DIP switches 3 and 4 of SW3 are “OFF”.

SW4 is a manual switch used to place an embodiment of the POE controller in BOOT MODE, which enables use of an Integrated Configuration Tool. In an embodiment, pressing and holding SW4 for up to about 5 seconds will turn LED D19 “ON”. Once the LED D19 is illuminated, the switch S4 is released. Thereafter, the LED D19 turns “OFF” once the Integrated Configuration Tool has been enabled.

SW5 is a manual switch used for HARDWARE RESET that restarts (resets) the PCB 200. The switch SW 5 should only be utilized when performing a controlled manual shut-down of the application as indicated below or if instructed to do so by customer support and/or a technician. To properly restart the PCB 200, both the switch SW5 and the switch SW6 should be used. First, press the switch SW6 to stop an application being run on the PCB 200. Then press and release the switch S5 to restart (reset) the PCB 200.

SW6 is a manual switch used for SHUTDOWN REQUEST that stops an application running on the PCB 200 and puts the PCB 200 into a maintenance mode, which allows the PCB 200 to be removed. Since the PCB 200 runs an operating system just like a computer, it must be shut down correctly. Pressing SW6 shuts down the operating system/application of the PCB 200, and is like using the “Shut down” feature of a computer. To properly restart the PCB 200, both the switch SW5 and the switch SW6 should be used. First, press the switch SW6 to stop an application being run on the PCB 200. Then press and release the switch S5 to restart (reset) the PCB 200.

SW7 is a manual switch used for RESTORE DEFAULTS that returns the configuration of the PCB 200 to the factory defaults. Specifically, pressing the switch SW7 for about five seconds restores the factory defaults for PRIMARY CONNECTION (ETHERNET), IP ADDRESS (192.168.6.6), MASK (255.255.255.0), and GATEWAY (192.168.6.1).

In an embodiment, the PCB 200 provides network and dial-up (fallback) capabilities in one board. Non-limiting examples of these capabilities include: support for ethernet networks; support for network protocols (e.g., DHCP, TCP/IP, UDP, and DNS); support for optional, integrated modem board for fallback dial-up connectivity; provision of nonvolatile storage (referred to as persistent mode of operation), which affords a faster reset recovery and allows for host-less operation of the POE controller; utilization of 32-bit platform, which provides fast response times and high capacity throughput; support for remote diagnostics; provision of a browser-based configuration tool; and provision of a tunable, offline, history buffer.

Figure 8:
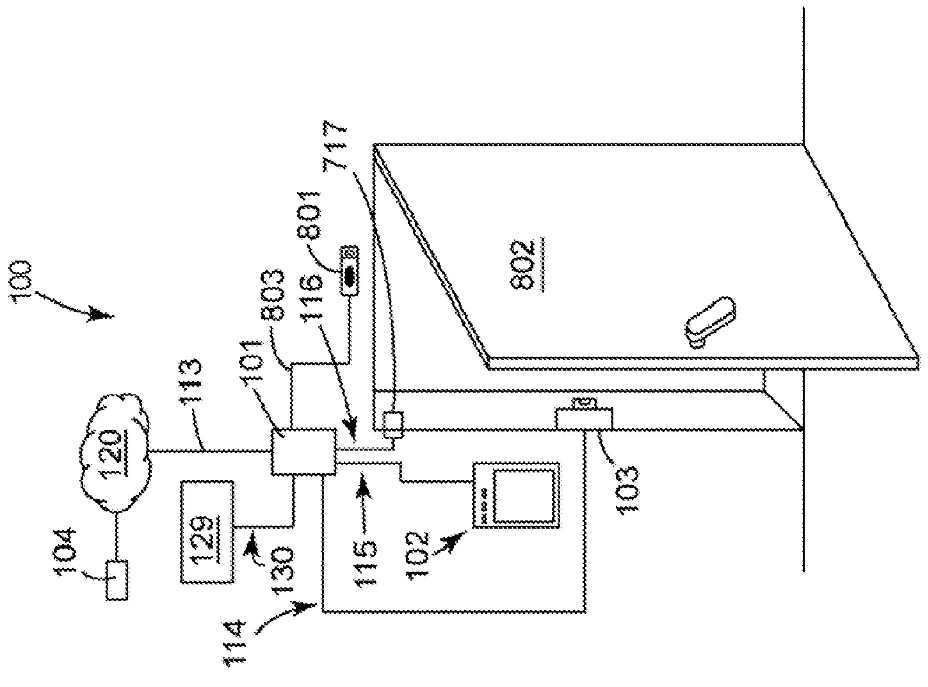
FIG. 8 is a diagram of an embodiment of the access control system of FIG. 1.
Figure 7:
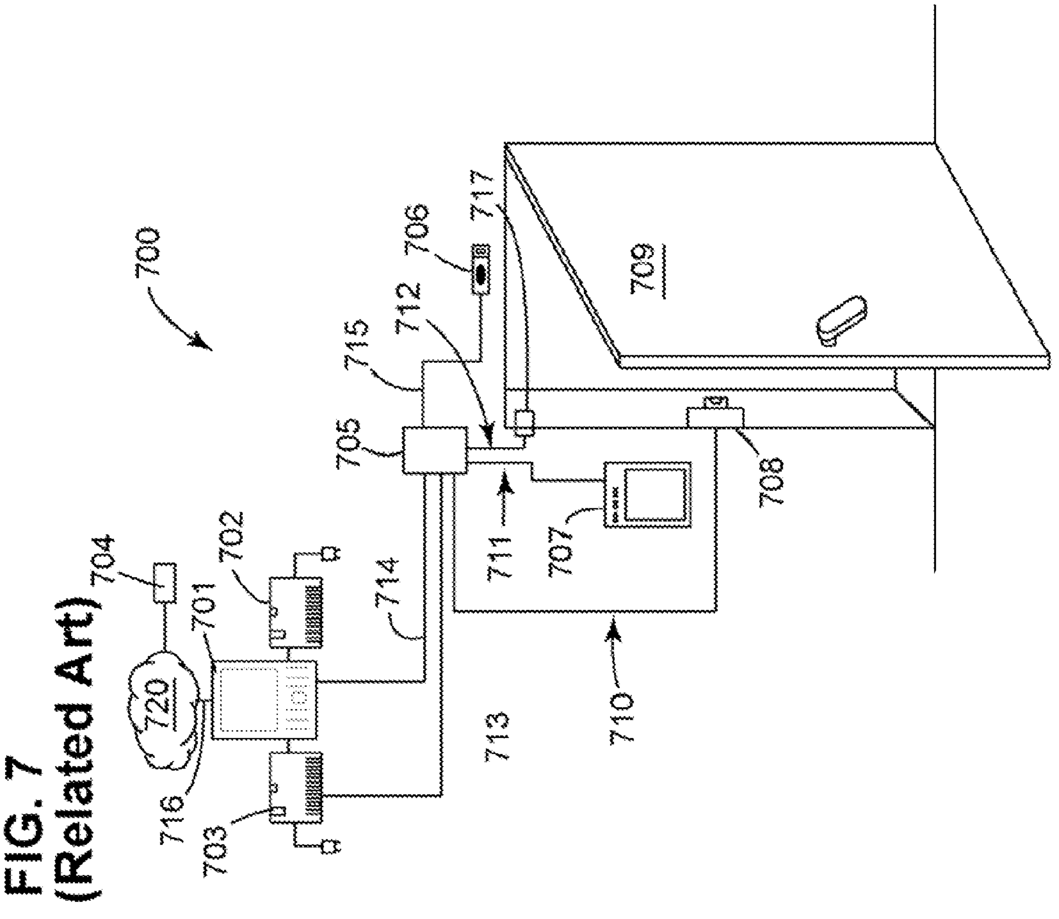
FIG. 7 (Related Art)
FIG. 7 (Related Art) is a diagram of a typical access control system.

FIG. 8 is a diagram of an embodiment of the access control system 100 of FIG. 1, with some of the components shown in FIG. 1 omitted for simplicity and ease of description. Referring to FIG. 8, the access control system 100 comprises a POE controller 101, an access control reader 102, and a door strike 103 (which is installed in a jamb of a door 802). The door strike 103 and the access control reader 102 are each powered via electrical power supplied via an ethernet port of the POE controller 101. Consequently, if FIG. 8 is compared with FIG. 7 (Related Art), it is seen that embodiments of the new access control system 100 eliminate at least the junction box 705, the external power supply 702, and the external power supply 703. Consequently, some advantages afforded by embodiments of the access control system 100 over the prior access control systems 700 include, but are not limited to: less equipment, fewer terminations, less wiring (since the access control system 100 is ethernet (CAT-5) based), edge of network devices, full intelligence, and electrical power provided via an ethernet connection.

Referring again to FIG. 8, a communications path 114 couples the POE controller 101 with the door strike 103. A communications path 115 couples the POE controller 101 with the access control reader 102. A communications path 130 couples the POE controller 101 with a FACP 129. A communications path 116 couples the POE controller 101 with a door sensor 717. Additionally, the POE controller 101 may be coupled with a network 120, a remote POE source (not shown), and a remote host computer 104 via an ethernet communications path 113. The POE controller 101 may also be coupled with an exit device 801 via a communications path 803.

Referring back to FIGS. 1 and 6, embodiments of fully or partially assembled components of the access control system 100 (including one or more components of the POE controller 101) may be made and/or sold as a kit for providing secured access to a door. The kit may include at least a controller 101 having an ethernet port J10, wherein the controller 101 is configured to operate using electrical power supplied via the ethernet port J10, and wherein the controller 101 is further configured to control an access device 102 and a door strike 103 (and/or 105). The controller 101 may further comprise a Fire Alarm Control Panel (FACP) circuit (not shown) and/or connector J6 for coupling the controller 101 with a FACP 129. As mentioned previously, the controller's integrated FACP circuit is configured to override the controller 101 and de-latch the door strike 103 (and/or 105) when the Fire Alarm Control Panel 129 is in an alarm condition. The kit may further include a door strike 103 (and/or 105) that is configured to operate using a portion of the electrical power supplied to the controller 101 via the controller's ethernet port J10. The kit may further include an access device 102 configured to operate using a portion of the electrical power supplied via the controller's ethernet port J10. The kit may further include a door sensor 717 and/or an output device 107 (and/or its relay 106)

The components and arrangements of the POE controller and access control system, shown and described herein are illustrative only. Although only a few embodiments of the invention have been described in detail, those skilled in the art who review this disclosure will readily appreciate that substitutions, modifications, changes and omissions may be made in the design, operating conditions and arrangement of the preferred and other exemplary embodiments without departing from the spirit of the embodiments as expressed in the appended claims. Accordingly, the scopes of the appended claims are intended to include all such substitutions, modifications, changes, and omissions.

What is claimed is:

1. A system for providing security access to a door, the system comprising:

a controller comprising an Ethernet port, a microprocessor, and a memory, the controller configured to operate using electrical power supplied via the Ethernet port;

a door strike device coupled with the controller, the door strike device configured to latch and de-latch the door;

a protection device connected between the door strike device and the controller, the protection device configured to electrically protect the controller;

a door access device coupled with the controller;

an output device comprising at least one of a siren, horn, and lamp coupled with, and controlled by the controller;

wherein the controller is further configured to receive input over a wire pair from a fire alarm control panel (FACP), wherein control of the door strike device and door access device, is overridden upon receipt of an alarm condition signal from the FACP;

wherein the controller is further configured to determine an access privilege associated with data associated with a user of the door that is input to the door access device;

wherein the microprocessor is configured to program the controller, to dynamically load one or more firmware programs and/or software programs to the memory, and to program the output device when the output device is coupled with the controller using a wire pair; and wherein the door strike device and the door access device are each configured to operate using a portion of the electrical power supplied to the controller via the Ethernet port.

2. The system of claim 1, wherein the protection device is a diode.

3. The system of claim 1, wherein the protection device is a metal oxide varistor.

4. The system of claim 1, wherein the controller is configured to control operation of both the door strike device and the door access device.

5. The system of claim 1, wherein the controller further comprises:

a power conversion circuit for processing the electrical current to produce and apply a predetermined voltage to each of the door access device and the door strike device.

6. The system of claim 1, further comprising:

a host computer coupled with the controller and configured to transmit and receive data therebetween.

7. The system of claim 6, wherein the controller further comprises:

a memory containing a database, wherein the database contains stored information that permits stand-alone operation of the controller, the door strike, and the access device when data transfer between the controller and the host computer ceases.

8. The system of claim 1, wherein the controller is configured to de-latch the door strike device when the FACP is in an alarm condition.

9. The system of claim 6, wherein the controller is further configured to transmit to the host computer data indicative of at least one of case tampering, AC power failure, and a low battery pack back-up condition.

10. The system of claim 1, wherein the controller further comprises a built-in configuration tool that is accessible over a computer network.

11. The system of claim 1, wherein the door strike device is one of an electric door strike and an electromagnetic door strike.

12. The system of claim 1, wherein the door access device is an access control reader.

13. A controller configured to control access to one or more doors, the controller comprising:

an enclosure; and a printed circuit board positioned within the enclosure, wherein the printed circuit board comprises:

a memory;

a microprocessor coupled with the memory;

an Ethernet port configured to receive an Ethernet cable that provides both electrical power and a communications path; and a circuit coupled with the Ethernet port and configured to transform all or part of the electrical power and to route the same to one or more components of the controller and to at least one peripheral device coupled with the controller through a wire pair, and at least one output device comprising at least one of a siren, horn, and lamp coupled with the controller through a wire pair;

a protection device connected to the wire pair that couples the at least one peripheral device and the controller, the protection device configured to electrically protect the controller;

wherein the controller is configured to couple with a wire pair with a Fire Alarm Control Panel (FACP) to unlock the one or more doors when the FACP is in an alarm condition;

wherein the microprocessor is configured to program the controller, to dynamically load one or more firmware programs and/or software programs to the memory, and to program the at least one peripheral device is coupled with the controller using a wire pair.

14. The controller of claim 13, further comprising:

a back-up power source configured to provide electrical power to the computer microprocessor and the at least one peripheral device coupled with the controller.

15. The controller of claim 13, wherein the protection device is a diode.

16. A kit for providing secured access to a door, the kit comprising:

a controller comprising a microprocessor, a memory, and an Ethernet port, wherein the controller is configured to operate using electrical power supplied via the Ethernet port;

wherein the controller is further configured to control, power, and receive input from one or more peripheral devices including a door strike device, a door access device, and an output device comprising at least one of a siren, horn, and lamp; and wherein the microprocessor is configured to program the controller, to dynamically load one or more firmware programs and/or software programs to the memory, and to program the one or more peripheral devices when the one or more peripheral devices are coupled with the controller using a wire pair; and a protection device connected to the wire pair that couples the one or more peripheral devices and the controller, the protection device configured to electrically protect the controller; and wherein the controller is configured to receive inputs from a fire alarm control panel (FACP), connected by a wire pair, and to operate at least one of the peripheral devices in response to an alarm condition input from the FACP.

17. The kit of claim 16, wherein the protection device is a diode.

18. The kit of claim 16, wherein the protection device is a metal oxide varistor.

19. The kit of claim 16, wherein the controller is configured to de-latch a door strike when the FACP is an alarm condition.

20. The kit of claim 16, wherein the door strike device is configured to operate using a portion of the electrical power supplied to the controller via the Ethernet port.

21. The kit of claim 16, wherein the door access device is configure to operate using a portion of the electrical power supplied via the Ethernet port, and wherein the door access device is an access control reader.

22. The kit of claim 20, wherein the door strike device is one of an electric door strike and an electromagnetic door strike.

* * * * *